Figure 1:
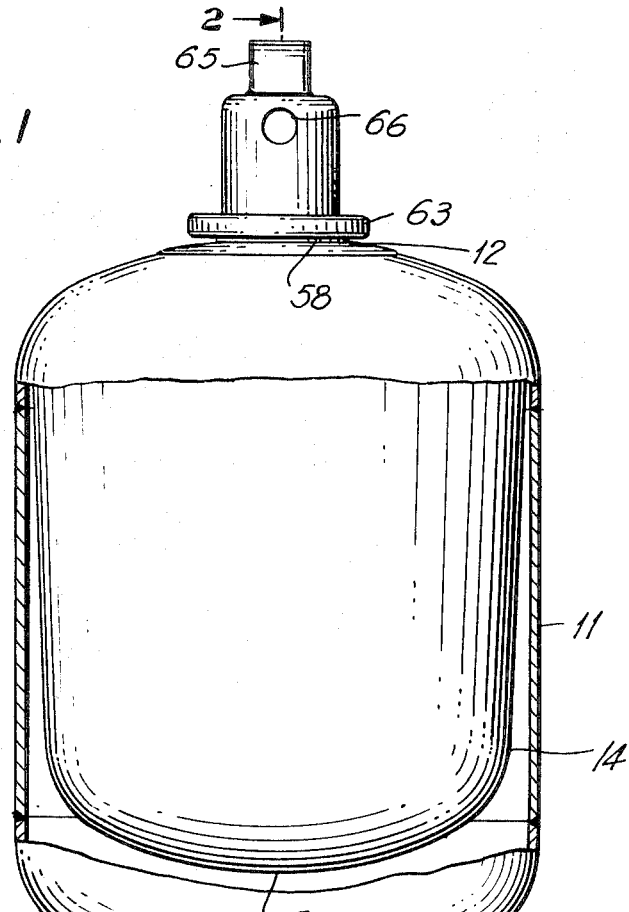

United States Patent

[11] 3,593,746

[72] Inventors Murray Allewitz;
 Abduz Zahid, both of Los Angeles, Calif.
[21] Appl. No. 742,596
[22] Filed July 5, 1968
[45] Patented July 20, 1971
[73] Assignee Greer Hydraulics, Inc.
 Los Angeles, Calif.

[54] PRESSURE VESSEL
 1 Claim, 4 Drawing Figs.

[52] U.S. Cl. .................................................. 138/30
[51] Int. Cl. .................................................. F16l 55/04
[50] Field of Search ......................................... 138/30

[56] References Cited
 UNITED STATES PATENTS

| 2,354,201 | 7/1944 | Dand et al. | 138/30 |
| 2,380,866 | 7/1945 | Overbeke | 138/30 |
| 2,604,118 | 7/1952 | Greer | 138/30 |
| 2,710,630 | 6/1955 | Greer | 138/30 |
| 2,764,103 | 9/1956 | Mercier | 138/30 X |
| 2,936,787 | 5/1960 | Mercier | 138/30 |
| 3,148,705 | 9/1964 | Mercier | 138/30 |

FOREIGN PATENTS 1,277,266 10/1961 France ........................ 138/30

Primary Examiner—Dorsey Newton
Attorney—Arthur B. Colvin

ABSTRACT: This invention relates to a pressure vessel of the type having a rigid container to be filled with fluid, usually oil and gas under pressure and having a deformable partition intervening between such fluids and more particularly relates to a pressure accumulator of relatively large size in the order of say 40-gallon capacity and which is extremely heavy and in the order of say 300 to 400 pounds. The partition is a bladder closed at one end and having an open mouth at its other end. The container has longitudinally aligned ports at opposed ends and is designed to be mounted in vertical position with the upper port receiving a gas fitting to which the mouth of the bladder is secured, for charging of the bladder with gas under pressure and the lower port having an oil fitting for charging the container with a fluid such as oil under pressure. The oil fitting has a mounting flange associated therewith to permit rigid mounting of the container in upright position on a suitable complementary flange that is connected to a source of oil under pressure such as an oil line. The gas fitting is mounted in the upper port so that it may readily be removed together with the bladder without need to disconnect the accumulator from the oil line and without need to handle the heavy accumulator.

INVENTORS
MURRY ALLEWITZ
ABDUZ ZAHID

BY

ATTORNEY

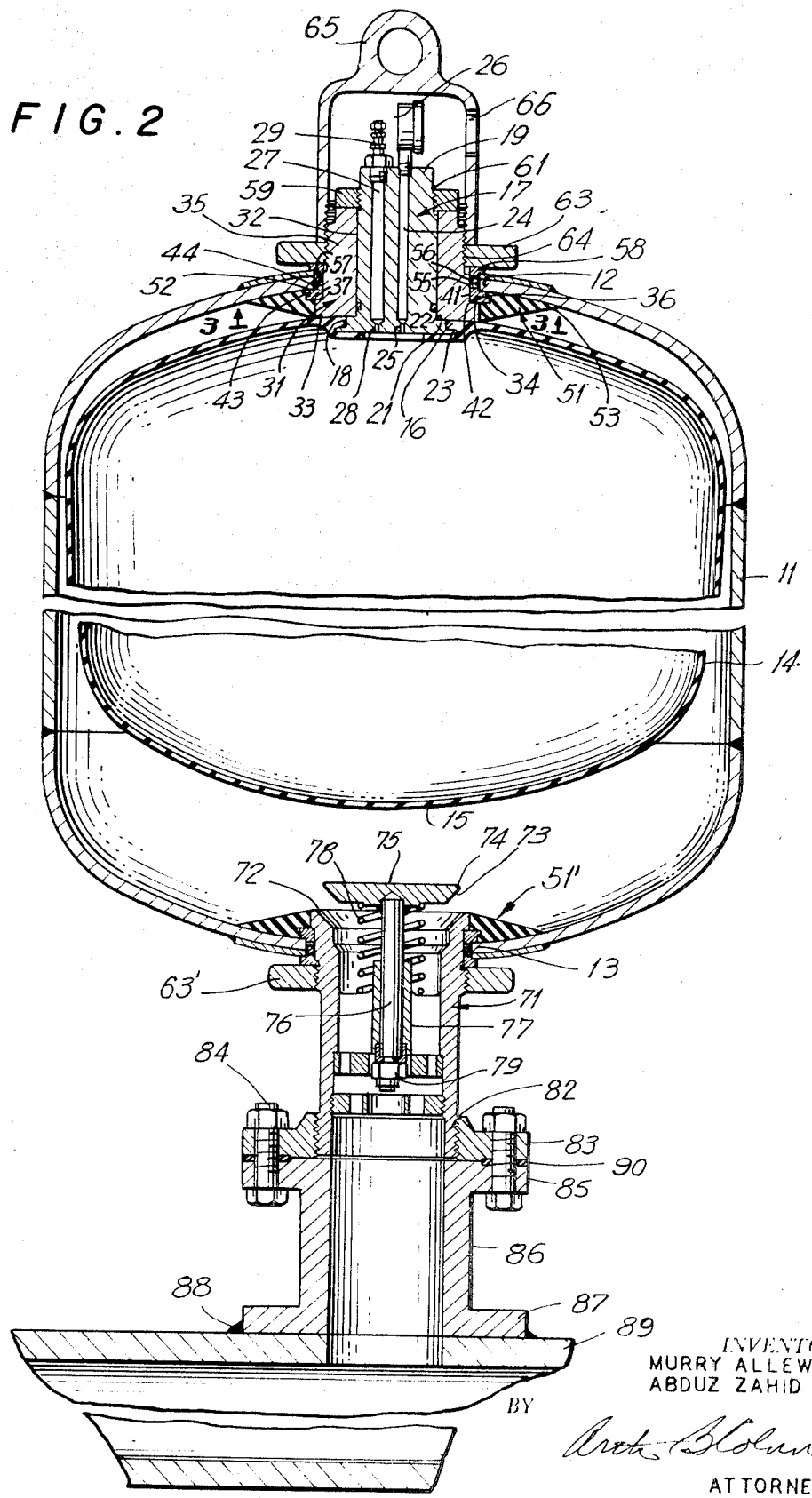

PRESSURE VESSEL

As conductive to an understanding of the invention, it is to be noted that where a large-size, heavy-pressure vessel such as a pressure accumulator, which may weigh in the order of 300 to 400 pounds for an accumulator having a capacity of 40 gallons is connected in vertical position on a pressure line for example, and the accumulator has a deformable bladder intervening between the axially aligned gas and oil ports at opposed ends of the accumulator, if the bladder should fail and the accumulator must be removed from the line to permit replacement of the bladder, in view of the heavy weight of the accumulator, it takes the services of several workmen to remove the same and in many cases a crane or hoist must be used for this purpose. The time involved for replacement of a defective bladder is thus considerable with the result that the equipment controlled by the accumulator must be out of service for a like period which is undesirable.

It is further to be noted that as the accumulator is opened for removal of the bladder, due to the large size of the accumulator and hence the large area of the valve stem to which the bladder is secured, that is exposed to the pressure in the accumulator, even with relatively low pressure in the accumulator, the forces exerted against the valve stem are relatively high. As a result, if a gas fitting in the upper port of the accumulator can be removed before substantially all of the pressure in the accumulator is relieved, when the mechanic disassembling the accumulator has partially released the air fitting, it may suddenly blow out and cause severe injury.

It is accordingly among the objects of the invention to provide a large capacity, relatively heavy pressure vessel, which may be mounted in vertical position and which has a deformable bladder therein intervening between two fluids such as oil and gas under pressure and which permits removal of the bladder for replacement, without need for removing the pressure accumulator from a line to which it is connected and with assurance that such bladder may be removed without likelihood of the fitting to which it is connected, blowing out of the accumulator when it is partially loosened.

According to the invention, these objects are accomplished by the arrangement and combination of elements hereinafter described and particularly recited in the claims.

Figure 4:
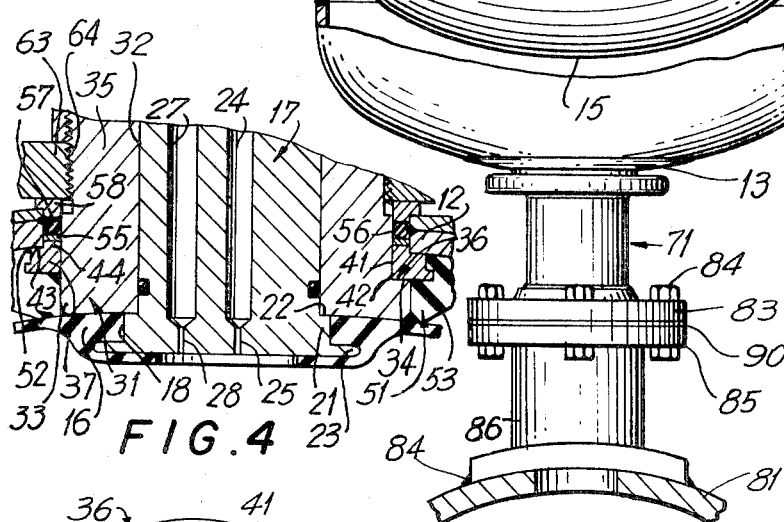
Figure 3:
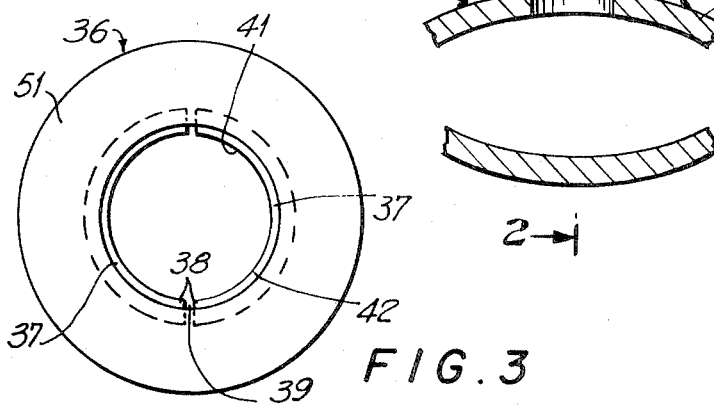

In the accompanying drawings in which is shown one of various possible embodiments of the several features of the invention, FIG. 1 is a side elevational view partially broken away of a pressure system according to the invention;

FIG. 2 is a longitudinal sectional view on a larger scale of the pressure system taken along line 2-2 of FIG. 1, with parts broken away, FIG. 3 is a plan view of the deformable locking member taken along line 3-3 of FIG. 2, and FIG. 4 is a detail view on a larger scale of the locking member mounting assembly.

Referring now to the drawings, the pressure vessel comprises a container 11, preferably of strong rigid material such as steel, cast aluminum or the like, capable of withstanding high pressures. The pressure vessel illustratively is large in size, having a capacity in the order of 40 gallons and having a weight in the order of 300 to 400 pounds.

The container 11 is substantially cylindrospherical as shown and has a deformable partition intervening between the gas port 12 and the liquid port 13 thereof. Preferably, the partition is a collapsible and expansible bag or bladder 14 which desirably is of resilient material such as rubber or synthetic plastic of like physical characteristics, which in distended but substantially unstretched condition is smaller than the cavity of the container. The bladder 14 is closed at one end as at 15 and has a mouth 16 at its other end in which a fitting 17 is secured as by molding at 18.

More particularly, the fitting 17 comprises a cylindrical body portion 19 having an enlarged diameter portion 21 at its inner end defining an annular shoulder 22 and forming an end plate having a peripheral flange 23. The mouth 16 of the bladder is molded to the end plate 21, as is shown in FIG. 4.

The body portion 19 has a central bore 24 therethrough of reduced diameter at its inner end as at 25 which provides communication between the interior of the bladder and a suitable pressure gauge 26 connected to the outer end of bore 24. In addition, the body portion 19 has an axially displaced bore 27 therethrough of reduced diameter at its inner end as at 28 and having a suitable valve 29 at its outer end by means of which the bladder may be charged with gas under pressure.

Means are provided releasably to retain the fitting 17 in the port 12. Such means may be of the type shown and described in U.S. Pat. No. 2,936,787.

More particularly, the port 12 has a cylindrical plug 31 positioned therein, the latter having a longitudinal bore 32 therethrough and having a flange 33 at its inner end defining an annular shoulder 34 and a reduced neck portion 35. The outer diameter of the flange 33 is slightly less than the diameter of port 12 so that it may readily be inserted therethrough and the neck 35 is of length such that it may protrude from port 12.

The plug 31 is affixed to the container 11 by a locking member, desirably a ring 36 constructed so that it may readily be deformed for insertion through said port 12 into the container 11. The locking member 36 shown in FIGS. 1 and 3 desirably comprises a plurality of arcuate segments 37, preferably of hardened metal such as steel. The segments, two of which are illustratively provided, each is slightly less than 180° of arc so that when juxtaposed to form a ring the adjacent ends 38 thereof may be spaced from each other as at 39.

The ring formed by said juxtaposed segments has an inner diameter but slightly larger than the outer diameter of neck 35 of plug 31 so that the inner wall 41 of said segments 37 may snugly encompass neck 35 with shoulder 34 resting on the inner periphery 42 of said segments.

The outer diameter of the ring formed by said juxtaposed segments 27 is greater than that of port 12 so that the top surface 43 of the segments 37 will seat against the inner periphery of port 12 as is clearly shown in FIG. 1.

The top surface of each of the segments 27 adjacent the inner periphery thereof has an arcuate hub 44 of width substantially equal to the difference between the outer diameter of neck 35 and the diameter of port 12 so that said hub 44, when positioned between neck 35 and port 12, will center the plug 31 in said port 12.

Bonded to the bottom surface of the segments 37, as well as to the sides thereof, in any suitable manner such as by cementing or vulcanizing, is an annulus or ring 51 of resilient material such as natural or synthetic rubber. The resilient ring 51 has an inner diameter on its outer surfaces as at 52 which exceeds the inner diameter of the ring formed by the juxtaposed segments 37 so that the periphery of port 12 will abut against the metal surface 43 of the segments 37.

The ring 51 is desirably triangular in cross section defining an inclined supporting surface 53 for the portion of the bladder 14 adjacent its mouth 16 to support such portion of the bladder when the latter is expanded.

In order to provide a liquidtight seal between the neck 35 of plug 31 and the wall 55 of port 12, a resilient sealing ring 56, preferably an O-ring, encompasses the neck 35 between hub 44 and an adjacent hub 57 formed on the inner periphery of ring member 58.

In assembling the accumulator, the fitting 17 to which the bladder is secured, is inserted through the bore 32 in plug 31 and securely locked in such plug by means of a nut 59 screwed on the externally threaded end 61 of the fitting 17. Thereupon, the bladder 14 as well as the plug 31 with the fitting 17 secured thereto, are passed through the port 12 into the container 11. The locking member 36 is then deformed as by folding the two segments 37 toward each other. As a result, the deformed locking member 36 may readily be passed through port 12 into the container 11. The locking members 36 is then released and by reason of the resilience of the folded ring 51 will assume its original ringlike shape so that it may be passed around the neck portion 35 of plug 31. The plug 31 can then be drawn outwardly until its shoulder 34 seats against the inner periphery 42 of segments 37 which will urge the outer surface 43 of the rigid segments against the inner periphery of the port 12 of the container. The sealing ring 56 and ring member 58 may then be placed around the neck 35 and a nut 63 is then screwed on the externally threaded portion 64 of neck 35 and tightened securely to retain the parts in assembled relationship.

A cap 65 encompassing the upper end of the plug 31 protects the air valve 29 and pressure gauge 26 with the wall of the cap 65 having a port 66 to permit visual reading of the pressure gauge 26.

The oil port 13 of the accumulator which preferably is the same diameter as the port 12, has a sleeve 71 positioned therein. The sleeve 71 is retained in the port 13 in the same manner as the plug 31 is retained in the port 12 and corresponding parts have the same reference numerals primed.

The inner end of sleeve 71 is desirably beveled as at 72 to define a seat for the correspondingly beveled edge 73 of a valve head 74, against the top surface 75 of which the closed end 15 of the bladder is designed to abut.

The valve head has an axial stem 76 which is slidably mounted in an axial guide member 77 and is normally urged outwardly to open position by a coil spring 78 encompassing the stem 76, a nut 79 screwed on the outer end of the stem 76 being designed to abut against the adjacent end of the guide 77 to limit inward movement of the valve head.

The outer end 82 of the sleeve 71 is externally threaded to receive a mounting flange 83. Flange 83 is designed to be connected by circumferentially arranged bolts 84 to a corresponding flange 85 positioned at the upper end of a sleeve 86 which has a flange 87 at its lower end that is connected as by welding as at 88 to a pressure line 89, for example.

Desirably, a gasket 90 is positioned between said flanges to prevent leakage.

It is of course to be understood that because of the large size and heavy weight of the accumulator 11, the sleeve 71 and the flanges 83, 85, 87 as well as the sleeve 86 are all of great structural strength to provide rigid support for the accumulator 11 in vertical position.

In the event of failure of the bladder 14, there is no need to remove the accumulator from the line 89 to which it is mounted, but the bladder can readily be replaced by merely opening the port 12. This is accomplished by removing the cover member 65 and then unscrewing the nut 63. Thereupon, it is merely necessary to move the plug 31 inwardly into the container 11 so that the locking member 36 may be slipped off the neck 35 of the plug and deformed for removal through port 12.

If there is any air pressure in the bladder 14, the latter will press against the plug 31 and prevent displacement thereof.

It is apparent therefore that in disassembly of the accumulator, a mechanic cannot neglect first to release all of the air pressure remaining in the bladder and consequently there is no danger of injury as a result of the plug being blown out of the container.

After the plug 31 and bladder 14 connected thereto are removed from the container, the nut 59 is then unscrewed so that the fitting 17 and bladder 14 connected thereto can then be removed as a unit from the plug 31.

It is then a simple matter to insert another fitting 17 with a new bladder 14 connected thereto into the plug 31 and reassemble the device as previously described.

As the result of the construction above described in which the accumulator has a readily removable plug in the gas port 12 thereof, positioned at the upper end of the accumulator, the bladder can readily be replaced without need for removing the accumulator from the system in which it is connected.

This facility of replacing the bladder thus reduces the need for handling the heavy accumulator and reduces the "down" time of the system in which the accumulator is installed.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A hydraulic system comprising a pressure vessel adapted to be connected to a source of fluid under pressure, and mounted in vertical position, said pressure vessel weighing at least in excess of about 300 pounds and comprising a rigid container having axially aligned ports at opposed ends thereof defining respectively a gas port at the upper end of said container and a liquid port at the lower end of said container, a deformable and expansible bladder in said container intervening between said ports, said bladder having a mouth at one end, a gas charging fitting secured in the mouth of said bladder and extending outwardly therefrom, means releasably mounting said fitting in the gas port of said container, said means comprising an annular shoulder associated with said fitting and of diameter slightly less than the diameter of the opening in said port, a locking member encompassing said fitting and having an outer diameter greater than that of said port and an inner diameter less than the outer diameter of said shoulder, said locking member intervening between said shoulder and the periphery of said port with said shoulder abutting against said locking member, said locking member being conformed to permit introduction thereof into said container and such seating, a sleeve secured in the liquid port of said container and extending outwardly therefrom, axially aligned with said fitting, and mounting means associated with said sleeve for connection of the latter to said source of fluid under pressure with said sleeve and said container in substantially vertical position.